United States Patent [19]

Rider

[11] Patent Number: 4,723,736
[45] Date of Patent: Feb. 9, 1988

[54] ROCKET STAGING SYSTEM

[76] Inventor: Todd Rider, 501 W. "A" St., North Little Rock, Ark. 72116

[21] Appl. No.: 898,010

[22] Filed: Aug. 18, 1986

[51] Int. Cl.⁴ .......................... B64G 1/40; F02K 9/42
[52] U.S. Cl. .................................. 244/172; 102/377;
102/381; 60/39.48; 60/259; 244/74; 244/120;
244/135 R; 244/158 R
[58] Field of Search ............... 244/73 R, 120, 135 R,
244/74.2, 172, 158 R; 102/374, 377, 378, 381;
60/252, 257, 258, 259, 39-40

[56] References Cited

U.S. PATENT DOCUMENTS

| | | | |
|---|---|---|---|
| 2,114,214 | 4/1938 | Danblane | 102/378 |
| 2,753,801 | 7/1956 | Cumming | 102/381 |
| 2,954,670 | 10/1960 | Helus et al. | 60/259 |
| 3,043,221 | 7/1962 | Swanser | 60/259 |
| 3,308,624 | 3/1967 | Ciancitto | 60/259 |
| 3,945,203 | 3/1976 | Kayser | 60/259 |

Primary Examiner—Galen Barefoot
Attorney, Agent, or Firm—Stephen D. Carver

[57] ABSTRACT

An improved rocket staging system for missiles and the like wherein a carriage borne rocket engine assembly is sequentially employed within separate, generally aligned oxidizer stages which are generally coaxially disposed about the central rocket engine and its associated carriage. A central fuel tank is surrounded by several separate, cooperating, generally ring-shaped oxidizer tanks generally coaxially disposed about the rocket periphery. A plurality of oxidizer delivery lines run through each of the outer tanks and up to the top of the fuel tank, where a flexible hose brings oxidizer down to the engine carriage. As fuel is consumed, the rocket motor carriage slides upwardly inside the fuel tank in response to thrust. When the carriage is firmly seated inside the next higher oxidizer tank and all of the propellant has been removed from the lowest tank, the lowest tank is jettisoned to discard unnecessary mass. Thus when a stage is jettisoned, its oxidizer lines disconnect from those of the next higher stage and check valves in the lower endsd of the lines in the next stage prevent significant oxidizer spillage. Oxidizer intake ports such as solenoid valves mounted on the oxidizer delivery lines in each stage are kept open in the lowermost stage and closed in all other stages to allow oxidizer to be drawn only from the lowermost tank.

15 Claims, 9 Drawing Figures

ROCKET STAGING SYSTEM

BACKGROUND OF THE INVENTION

The present invention relates generally to multi-stage rockets, missiles and the like. More particularly the present invention is related to a system wherein a single propulsion system may be sequentially operationally employed in conjunction with a plurality of separate, intercommunicating, axially aligned stages.

Rockets have long been separated into multiple, substantially independent stages so that unnecessary mass may be periodically ejected during flight. Usually each independent stage comprises an independent propulsion system and an associated propellant supply. When the propellant in one stage has been consumed, this stage is jettisoned, and the next stage then ignites or fires using its own propulsion. This method allows the performance of the vehicle to be increased, for the excess mass of expended stages does not have to be carried during the remainder of the rocket's powered flight. Yet attempts to increase the rocket's performance even more by dividing it into a greater number of stages have failed because the mass of independent motors in each stage defeats the purpose of increasing the number of stages.

Other systems of staging have been proposed. U.S. Pat. No. 3,067,575 describes a rocket in which the motor rises up into the propellant tank as the propellant is consumed and melts the tank walls beneath it. However, this system requires seldom-used gel propellant. Additionally, it must pull the rocket motor upward with a separate hydraulic motor. Moreover, the latter system expends part of its thrust to melt the vessel walls, and it is susceptible to numerous difficulties associated with uniform and controlled consumption of the walls. Bono's vehicle, pictured in U.S. Pat. No. Des. 201,773, systematically empties and jettisons several propellant tanks strapped on a central motor-bearing core, according to Philip Bono and Kenneth Gatland, *Frontiers of Space*, The Macmillan Company, New York, 1969. But this rocket suffers from large mass and aerodynamic penalties and makes no provision for discarding the tanks inside the core.

Further attention is directed to the following U.S. Pat. Nos. 2,835,199; 2,988,879; 3,023,573; 3,032,979; 3,046,736; 3,067,574; 3,070,565; 3,122,884; 3,138,929; 3,154,041; 3,304,724.

SUMMARY OF THE INVENTION

The present invention is directed to an improved staging system for missiles, rockets and the like. In the best mode the present invention is adapted for use with rockets powered by liquid bipropellant systems. The invention contemplates the sequential use of a single motor in combination with separate cooperating "stages" which are generally coaxially disposed about the central rocket engine and its associated carriage. As the engine consumes fuel, it moves upwardly within the rocket core, and as the contents of separate oxidizer tanks are depleted, they are jettisoned.

The central fuel tank is surrounded by several separate, cooperating, generally ring-shaped oxidizer tanks generally coaxially disposed about the rocket periphery. The oxidizer in the outer tanks, such as liquid oxygen, may be used to insulate the fuel in the inner tank, such as liquid hydrogen. The turbopump-fed liquid bipropellant motor (or motors) is mounted preferably symmetrically on a sliding, gasket-wrapped carriage assembly, thereby sealing the lower end of the fuel compartment. The gasket is formed from a suitable conventional sealing material such as polytetrafluoroethylene. As the fuel is consumed, the rocket motors and the carriage slide upward inside the fuel tank due to the force of the motors' own thrust. When the carriage is firmly seated inside the next higher oxidizer tank and all of the propellant has been removed from the lowest tank, the lowest tank is released.

A plurality of evenly spaced oxidizer delivery lines run through each of the outer tanks and up to the top of the fuel tank, where a flexible hose brings oxidizer down to the engines. This hose is of the type well known to the art which will coil up as the distance between its ends is decreased, so that it coils up into the fuel tank as the propulsion unit rises. Conventional quick disconnect ports and check valves removably join the oxidizer delivery line segments in each stage to their corresponding parts in stages above and/or below.

Thus when a stage is jettisoned, its oxidizer lines disconnect from those of the next higher stage and check valves in the lower ends of the lines in the next stage prevent significant oxidizer spillage. Oxidizer intake ports such as solenoid valves mounted on the oxidizer delivery lines in each stage are kept open in the lowermost stage and closed in all other stages to allow oxidizer to be drawn only from the lowermost tank. Stages are fastened together by conventional means such as detonating cords, metal belts encircling the stage joints; the ends of each belt are fastened by an explosive bolt, the activation of which will result in the jettisoning of the stage below.

If preferred, units as described above, each with its own propulsion system, fuel tank, and multiple surrounding oxidizer tanks, may be coupled together. Storage regions for fuel and oxidizer may be reversed if preferred.

It is thus a primary object of my invention to provide a more efficient system of rocket staging which disposes of excess mass during the rocket's flight more efficiently than do conventional staging systems.

Another object is to provide a staging system of the character described which is compatible with conventional motors, valves and other systems.

It is also an object of the present invention to provide a more thermally efficient system of storing cryogenic propellants by insulating the propellant component stored in the central tank with the propellant component stored in the outer tanks.

A further object of the present invention is to support virtually all of the external surface area of the vehicle with internal pressure from the propellant tanks, thereby increasing the strength of the rocket.

It is a still further object of my invention to provide a sturdy structure due to the inner and outer walls of the vehicle.

Yet another object of the present invention is to provide a rocket with fewer intertank structures and interstages, thus making the vehicle shorter and less subject to bending moments and air friction as well as reducing the mass.

It is an object of the present invention to provide a system which suppresses propellant slosh due to the sliding motor carriage in the inner tank and the character of the smaller, ring-shaped outer tanks.

Another object of my invention is to prevent ullage problems in the central tank by using the sliding motor carriage of the present invention, which obviates the use of ullage motors by keeping the fuel compressed.

An object of my invention is to provide a tank structure in which the common wall between the inner and outer tanks and the shortened height of the outer tanks reduce the pressures exerted on the tank wall by the propellant.

It is an object of the present invention to provide a rocket with fewer motors, control systems, and other equipment, since one set of these items may be used with several stages.

Yet another object of the present invention to provide a vehicle in which the propulsion system does not have to be shut down when a stage is dropped, thereby increasing the vehicle's performance, improving the engine efficiency, and affording smoother acceleration.

Still another object of my invention is to provide a rocket whose segmented structure allows greater ease of manufacture and repair.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
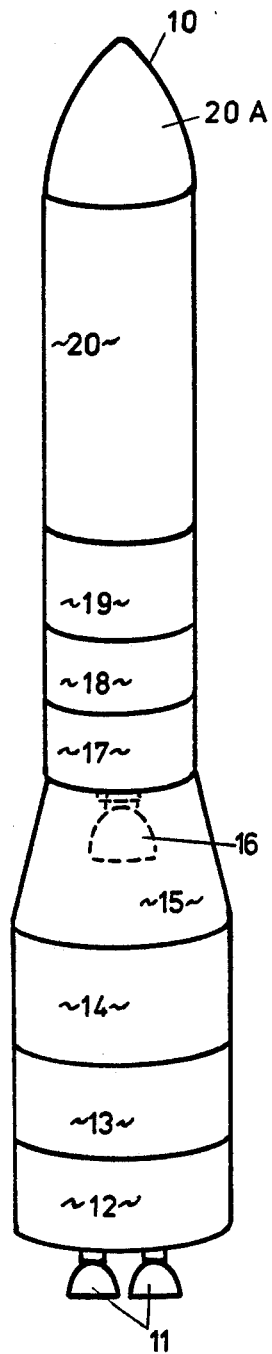
FIG. 1 is a pictorial, diagrammatic view of a rocket constructed in accordance with the best mode of the present invention.

With initial reference now directed to FIG. 1 of the appended drawings, an upright, generally cylindrical rocket constructed in accordance with the best mode of the instant invention has been generally designated by the reference numeral 10. Rocket 10 comprises two conventional reaction motors 11 which are associated with a single rocket carriage 54 adapted to move upwardly within rocket 10, as will hereinafter be described. Rocket 10 also comprises a plurality of lower oxidizer "stages" generally indicated by the reference numerals 12, 13, and 14. Rocket 10 utilizes carriage 54 and motors 11 operationally associated therewith for propulsion in association with stages 12, 13 and 14 which together operationally comprise the first motor stage of the rocket. Rocket 10 may also comprise an interstage portion 15 housing part of high altitude motor 16, separate cooperating upper stages 17, 18, and 19, and an optional payload fairing 20 which includes conventional nose cone 20A.

Rocket motors 11 and 16 are preferably liquid bipropellant propulsion systems of the type well known to the art. For example, Aerojet type LR87-AJ-11 engines would be suitable for "first stage" motors 11 which, through the carriage design shown, replace the engines which would otherwise be necessary in stages 13 and 14. High altitude, reduced thrust Aerojet type LR91-AJ-11 engines would be suitable for motor 16. Briefly, such motors preferably contain a gas generator which powers turbine-driven pumps used for drawing propellant from suitable conventional tanks and forcing it through spray injectors into the thrust chamber, where combustion takes place. Exhaust travels out the motor nozzle. Typically such items as sensors and valves are included to control fuel-to-oxidizer ratio, thrust, cooling, etc. Steering is accomplished by gimballing motors 11 and 16, moving jetavator collars surrounding the lower ends of the nozzles of said motors, injecting liquid into the exhaust, or through other suitable conventional means.

Figure 3:
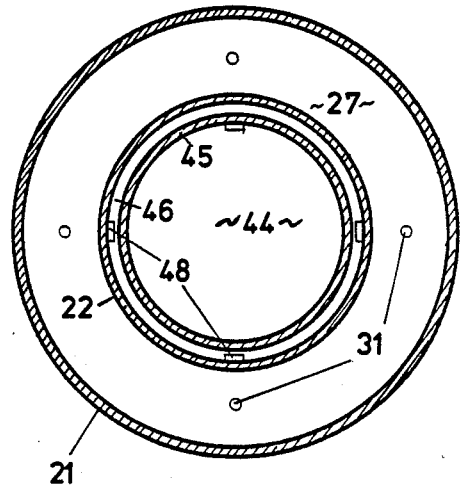
FIG. 3 is a vertical sectional view taken generally along line 3—3 of FIG. 2.
Figure 2:
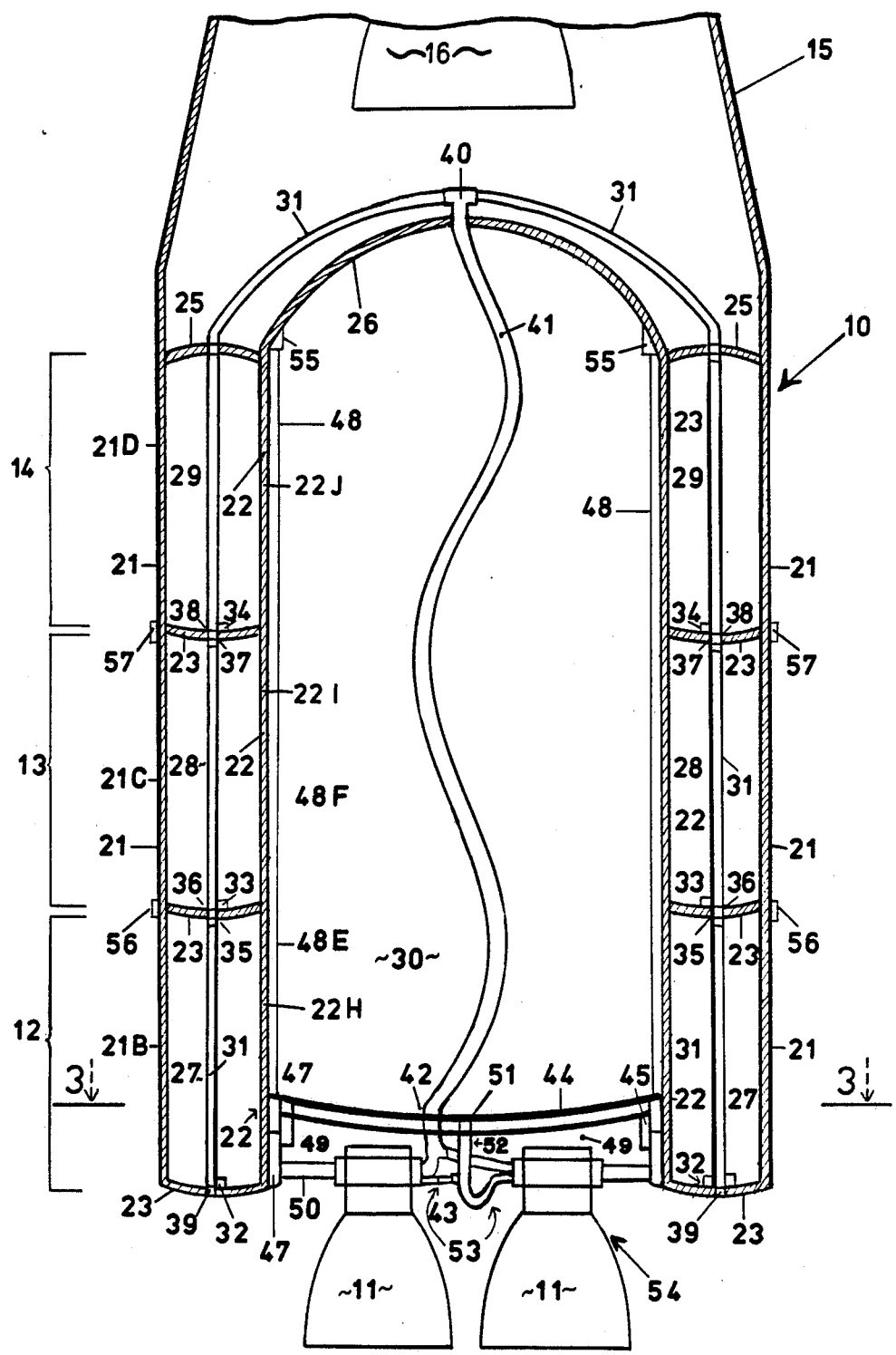
FIG. 2 is an enlarged, fragmentary sectional view of the lower end of the rocket shown in FIG. 1.
Figure 4:
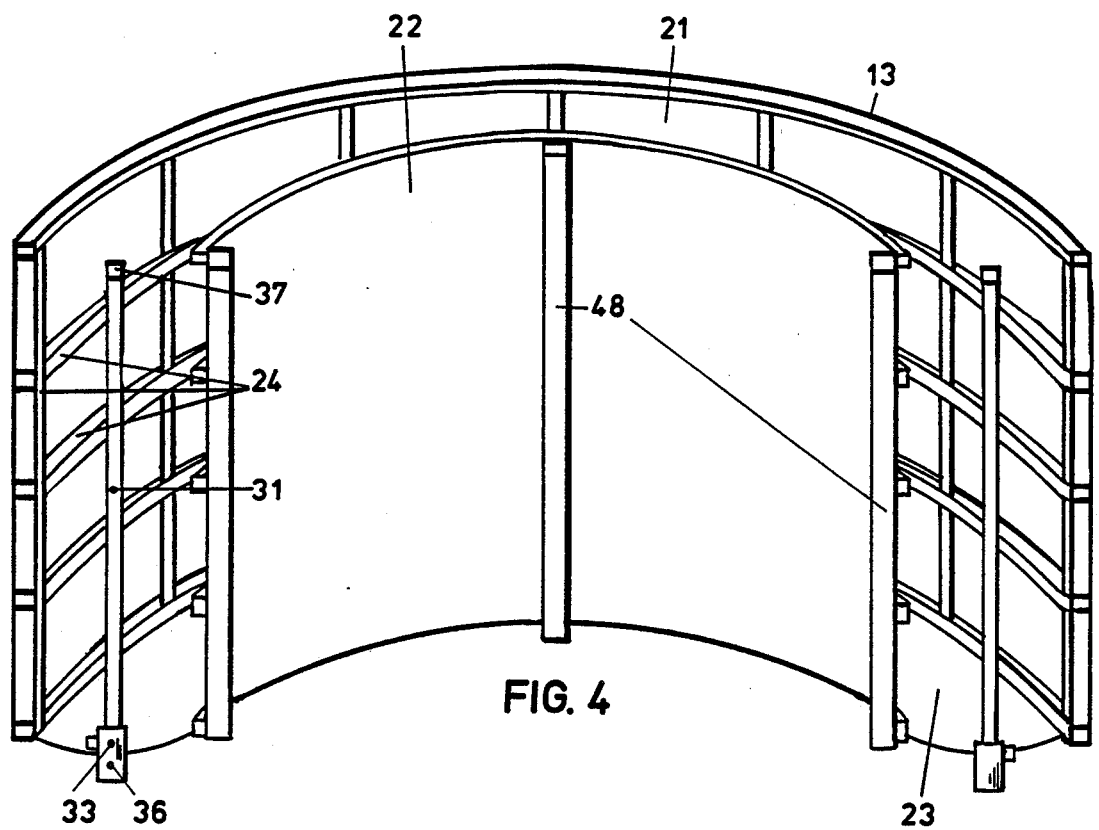
FIG. 4 is a fragmentary, sectioned pictorial view of a typical stage isolated to show more detail.

With reference now directed to FIGS. 2-4, each of the three lower rocket "stages" 12, 13, and 14 is formed from a preferably cylindrical outer wall 21, preferably cylindrical inner wall 22, and aft wall 23. Outer wall 21 and inner wall 22 are preferably reinforced in the conventional manner by support struts 24 as shown in FIG. 4. It must be appreciated that outer wall 21 is a composite of individual oxidizer tank walls 21B, 21C, and 21D, while similarly inner wall 22 is a composite of individual oxidizer tank walls 22H, 22I, and 22J. Upper annular wall 25 and central dome 26 seal the upper ends of the tanks in stage 14. Preferably the outer tanks formed by the above pieces will be designated as storing oxidizer and the inner core tank as containing fuel, although it is recognized that the location of the two propellant components could be reversed.

The inner and outer tanks are sealed at the joints between stages by conventional means such as cylindrical lips protruding from the bottoms of inner wall 21 and outer wall 22 in each stage which slidably fit into corresponding gasket-filled grooves in the upper ends of said walls in the stage below. Oxidizer 27, 28, and 29 is stored in the outer tanks of stages 12, 13, and 14, respectively. Fuel 30 is kept in the common inner tank.

A plurality of evenly spaced oxidizer delivery lines 31 are located in the oxidizer tanks of each of stages 12, 13, and 14 and have attached at some point, preferably immediately above aft walls 23, oxidizer intake valves such as conventional solenoid valves. These intake valves are 32 in stage 12, 33 in stage 13, and 34 in stage 14; initially in the flight of rocket 10 valves 32 are open and valves 33 and 34 are closed. The oxidizer delivery line segments 31 in each of stages 12, 13, and 14 are removably joined to the corresponding segments in the stage immediately above or below by conventional quick disconnect plugs and sockets. Plugs 35 attached to the upper ends of oxidizer lines 31 in stage 12 slidably fit into and seal with sockets 36 connected to the lower ends of oxidizer lines 31 in stage 13, while sockets 36 preferably contain conventional check valves designed to allow free flow of oxidizer upward while preventing oxidizer flow downward. Plugs 37 in stage 13 and sockets 38 in stage 14 function in a similar manner. The positions of the plugs and the sockets may be reversed, in which case the plugs would contain the aforementioned check valves. Optional valves 39 may be included in stage 12 to allow lines 31 to be used to fill the oxidizer tanks in connection with ground-based support equipment, and are kept closed in flight.

Oxidizer 27 is drawn through open intake valves 32 into delivery lines 31 and through connector 40 which joins lines 31 into flexible hose 41. Hose 41 is preferably of the type familiar to the art which is constructed of material such as aluminum or suitable synthetic plastic substances and which will coil up as the distance between its ends is decreased. One such hose is the "Self-Storing Air Hose" #2Z861 listed on page 825 of the Fall 1985 Wholesale Net Price Catalog of W. W. Grainger, Inc., based in Chicago. Any necessary connections to motors 11, such as electrical wiring for steering signals, may be attached to hose 41. Oxidizer 27 then passes through connector 42 and hoses 43 to the motors 11.

Figure 5:
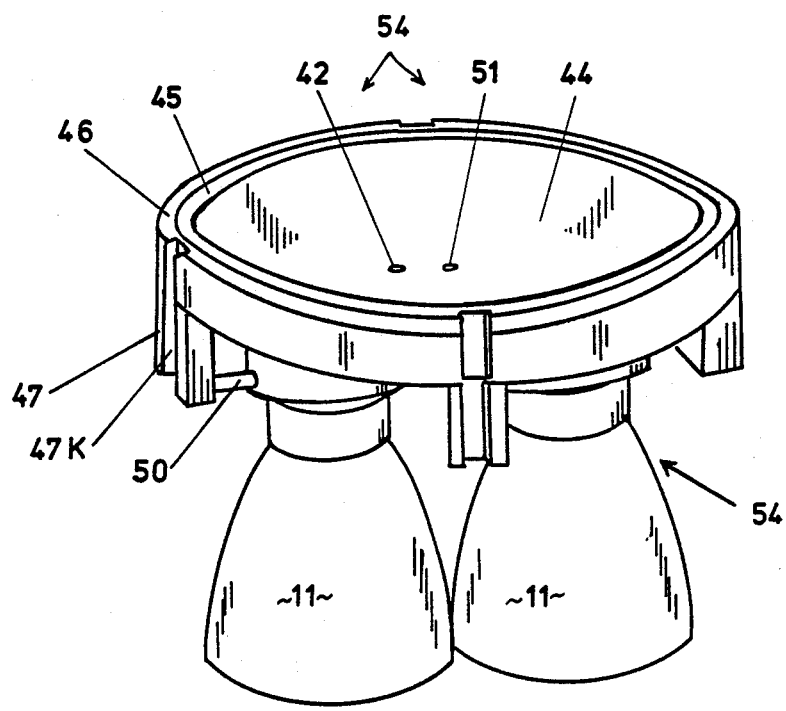
FIG. 5 is an isometric view of a motor assembly.

With additional reference now directed to FIG. 5, the rocket motor carriage assembly of the instant invention has been generally designated by the reference numeral 54. A generally concave aft fuel plate 44 is peripherally surrounded by a ring-shaped gasket support 45 which is surrounded by concentric gasket 46. Gasket 46 is preferably formed of an elastomeric material such as polytetrafluoroethylene ("Teflon").

Preferably connected to gasket 46 by support ring 45 are several skates 47 which slidably fit onto rails 48 that are preferably mounted longitudinally on the inner side of wall 22. Grooves in gasket 46 allow it to seal around rails 48, which are composed of slidably connected segments mounted in each of stages 12, 13, and 14. Motors 11 are attached to plate 44 by thrust posts 49 and may also be attached to skates 47 by connectors such as bars 50. Fuel 30 is drawn through intake valve 51, connector 52, and hoses 53 to the rocket motors 11. Assembly 54 generally designates motors 11, connector 42, hoses 43, plate 44, gasket support ring 45, gasket 46, skates 47, thrust posts 49, bars 50, connector 52, and hoses 53 as a unit.

When cryogenic propellant is used, coiling oxidizer hose 41, oxidizer hoses 43, and fuel hoses 53 are insulated by conventional means such as flexible accordion-like vacuum jacketing around said hoses. Insulation material well known to the art, such as polyurethane foam, is used to protect outer walls 21, inner walls 22, aft walls 23, forward walls 25, fuel dome 26, oxidizer delivery lines 31, stage 12 plugs 35, stage 13 sockets 36 and plugs 37, stage 14 sockets 38, valves 39, connector 40, oxidizer connector 42, plate 44, gasket support ring 45, fuel intake valve 51, and fuel connector 52.

As the fuel 30 is consumed, the thrust of motors 11 forces rocket motor carriage assembly 54 upward. As best noted in FIG. 3, a plurality of radially spaced apart rails 48 are located interiorly of the fuel tank or compartment, and are actually segmented, in that each rail is actually a composite of individual aligned rail elements, such as elements 48E, 48F, and 48G comprising portions of the individual generally annular oxidizer tanks previously discussed. Assembly 54 slides upward along rails 48 until gasket support ring 45 contacts stops 55. Skates 47 (FIG. 5) include intermediate channels 47K in which the rails 48 are operationally, slidably disposed. Once skates 47 are firmly seated in stage 13 and all of oxidizer 27 has been consumed, stage 12 is jettisoned.

Figure 6:
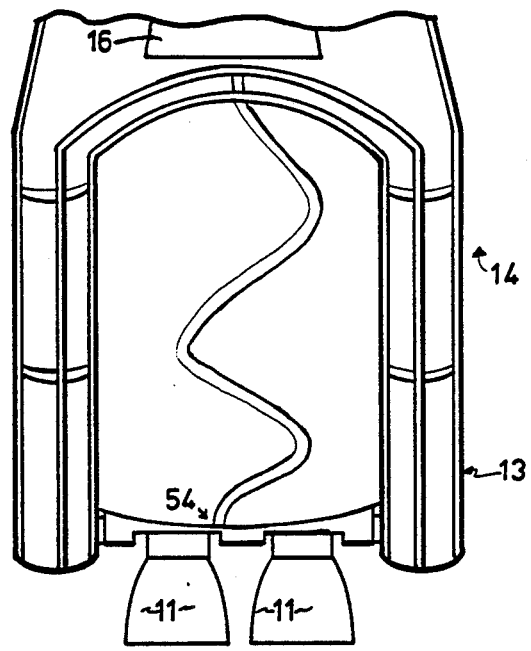
FIG. 6 is a fragmentary cross-sectional view of the lower end of the rocket similar to FIG. 2, but illustrating the apparatus after the lowermost oxidizer stage has been jettisoned.

The stage coupler such as detonating cord 56, explosive bolts, latches, or other suitable means of the type well known to the art is activated to trigger the release. Operation of such apparatus may readily be initiated in response to a remote command signal received from such means as a radio signal or the pilot or guidance system of rocket 10. The check valves in sockets 36 close and valves 33 open to supply oxidizer 28 to motors 11. FIG. 6 shows the vehicle 10 after stage 12 has been jettisoned. Coupler 57 is later used to release stage 13 in a similar manner.

It is preferred that the total height of assembly 54 be greater than that of each stage so that the exhaust of motors 11 cannot contact a stage which has not yet been jettisoned. Also it is preferred that all components of assembly 54 be of a size and arrangement such that only gasket 46 and skates 47 contact inner wall 22 and rails 48 as assembly 54 travels through stages 12, 13, and 14.

When all of fuel 30 and/or oxidizer 29 has been consumed, stage 14 and interstage 15 are jettisoned, motor 16 ignites and the upper three stages 17, 18, and 19 operate in a manner similar to that described for stages 12, 13, and 14.

Rails 48 are not required unless extensive steering will be performed with rocket 10. If these rails are included and if it is desired to temporarily shut down motors 11, a conventional rachet mechanism may be included on rails 48 and in skates 47 to prevent the motor assembly from moving to the aft when not in use. It is understood that means other than rails 48 protruding from inner walls 22 and slidably attached to skates 47 could be used to guide assembly 54 as it rises. For example, skates 47 could be designed to slidably fit into vertical indentations in inner wall 22.

To compare the performance of my invention to that of conventional staging systems, computer flight simulations were designed and run. Detailed specifications of several conventional vehicles were obtained, and the structure of comparable vehicles using the present invention was estimated and included generous mass penalties. The simulations were numerical integrations conforming to the requirements of the BASIC computer language as described by Robert Whitsitt, *TI Extended BASIC*, Texas Instruments Incorporated, Dallas, 1981. The programs were based on the equations of Bate, Mueller, and White published in *The Fundamentals of Astrodynamics*. Dover Publications Inc., New York, 1971.

EXAMPLE 1

The Titan 34B/NUS was selected because it is the common core of a large family of launch vehicles in wide use and utilizes hydrazine, unsymmetrical dimethylhydrazine (UDMH), and nitrogen tetroxide, which are storable liquid propellants. Using typical Titan parameters, the original first stage was divided into three lower stages and the original second stage was divided into three upper stages as per the present invention. Liberal mass penalties were added at all reasonable points to insure that the performance of the "improved Titan" would not be overestimated.

Figure 7:
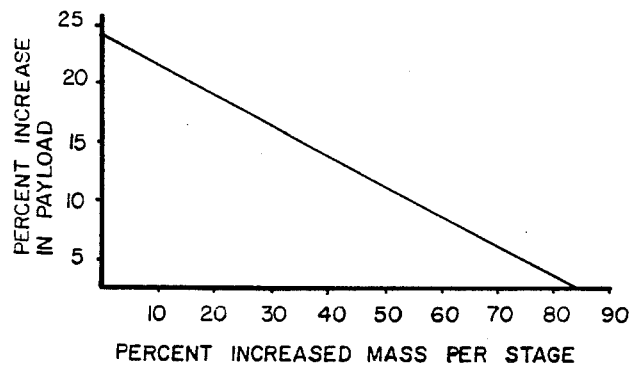
FIG. 7 is a graph of percentage increased payload versus percentage increased stage mass for the improved Titan missile discussed below.

The improved vehicle was found to have 15% greater range or 25% greater payload capability than the conventional Titan. It was also found that an improved Titan with a launch mass 18% less than that of the conventional vehicle could carry as much payload for as great a distance as the conventional Titan. A sensitivity analysis of the improved Titan was run to demonstrate that the mass of each stage could be increased by up to 82% with additional penalties before the present invention's performance advantage would be lost. See FIG. 7 for a graph of percentage payload increase versus percentage stage mass increase.

Figure 8:
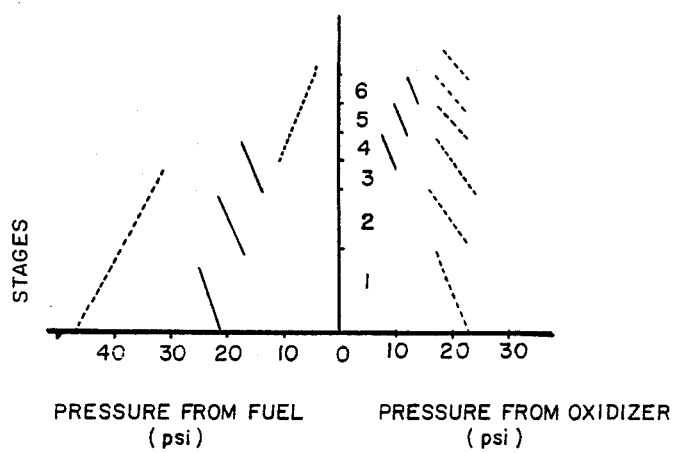
FIG. 8 is a graph of the tank pressures at launch in the improved Titan.

The pressure exerted on the motor carriage gasket in the lower three stages of the improved Titan was found by dividing the total thrust by the cross-sectional area of the fuel tank, yielding 46 pounds per square inch. By subtracting the vapor pressure of the oxidizer on the other side of the wall, the maximum net pressure on the inner wall was shown to be 29 psi. The gasket pressure of the motor assembly used in the upper three stages was only 20 psi when said motor assembly was firing. See FIG. 8 for a complete analysis of the tank pressure at launch.

EXAMPLE 2

The Delta 3914 was chosen as another common launch vehicle. Using typical vehicle and trajectory specifications in a manner similar to that employed with the Titan example, the original first stage was divided into three stages and the original second stage was divided into two stages in accordance with the present invention. The strap-on boosters and the original third stage, which use solid propellant, were left unchanged. Again numerous mass penalties were included. To insure accuracy, the simulation contemplated a launch from the Kennedy Space Center on a spherical, rotating earth and followed the trajectory data for placing a satellite into a geosynchronous transfer orbit.

Figure 9:
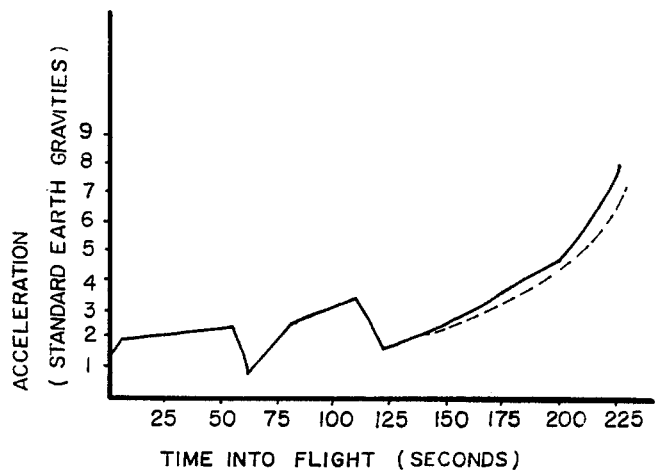
FIG. 9 is a graph comparing the accelerations of the conventional and improved Delta rockets discussed below.

The simulated improved Delta was able to carry 21% more payload into the conventional orbit or to carry the conventional payload mass into an orbit 55% higher at apogee and 88% higher at perigee than that of the conventional vehicle. An improved Delta with 15% less launch mass than the conventional Delta could carry the same payload into the same orbit as the standard vehicle. It was found that the mass of each improved stage could be increased by 72% with additional penalties before my invention's performance advantage would be lost. Finally, FIG. 9 compares the acceleration of the improved vehicle when it is carrying the conventional payload into the higher orbit with the acceleration of the conventional Delta; at most the acceleration of the improved vehicle is only 31 feet per second squared, or less than one standard earth gravity, greater than that of the conventional rocket.

EXAMPLE 3

A working model using gasoline and oxygen was constructed. A motor built from steel and aluminum was surrounded by a "Teflon" gasket. The motor assembly was slidably mounted inside an aluminum fuel tank, while oxygen was supplied from an external tank via coiled copper tubing running through the gasoline compartment to the top of the motor. Since the model was too small to use turbopumps to draw fuel into the combustion chamber as would an actual launch vehicle, a pressure feed system was accomplished by forcibly sliding the motor with a pneumatic piston. The model was successfully static fired three times, demonstrating that the flexible tubing could deliver pressurized oxidizer and coil up as the engine moved and that a Teflon gasket could form a suitable seal around the sliding motor assembly.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rocket comprising:
    an elongated, generally cylindrical rocket body comprising an inner wall, a concentric larger diameter outer wall, an annular space defined between said inner and outer walls, and a generally tubular interior;
    a plurality of vertically stacked serially cooperating generally annular tanks generally coaxially disposed about said rocket interior and having outermost walls cooperatively defining said outer wall of said rocket;
    a fuel carried by said rocket and disposed within said tanks or said tubular interior;
    an oxidizer stored in the other of said tanks or said tubular interior; and,
    a rocket motor carriage associated with said rocket for providing thrust, said motor carriage comprising;
        at least one rocket motor adapted to be actuated to initiate flight of said rocket;
        means for delivering fuel and oxidizer to said rocket motor; and,
        means for operatively coupling said carriage to said rocket for facilitating vertical axial displacement of said carriage upwardly through said rocket interior; and,
    whereby said rocket carriage moves upwardly within said rocket during flight and, as the contents of said tanks is depleted, they may be serially ejected independently of said rocket motor carriage.

2. The rocket as defined in claim 1 including a plurality of radially spaced apart rail means defined within said rocket interior for securing and guiding said rocket motor carriage.

3. The rocket as defined in claim 2 wherein each of said rail means comprises axially aligned multiple segments, one segment associated with the interior of each of said annular tanks.

4. The rocket as defined in claim 1 wherein said carriage comprises a rigid circumferential supportive ring, and gasket means associated with the outer periphery of said ring for forming a seal between said ring and the interior of said rocket.

5. The rocket as defined in claim 4 including aft support plate means associated with said ring for sealing said rocket interior against said carriage.

6. The rocket as defined in claim 4 including a plurality of radially spaced apart rail means defined within said rocket interior for guiding said rocket motor carriage and permitting axial movement while resisting torsional displacements.

7. The rocket as defined in claim 6 wherein said ring includes skate means adapted to be slidably coupled to said rail means to facilitate axial displacement of said carriage within said rocket interior.

8. The rocket as defined in claim 7 wherein each of said rail means comprises axially aligned multiple segments, one segment associated with the interior of each of said annular tanks.

9. A rocket comprising:
an elongated, generally cylindrical rocket body comprising an inner wall, a concentric larger diameter outer wall, an annular space defined between said inner and outer walls, and a generally tubular interior;
a plurality of vertically stacked serially cooperating generally annular oxidizer tanks generally coaxially disposed about said rocket interior and having outermost walls cooperatively defining said outer wall of said rocket, each of said oxidizer tanks comprising a stage of said rocket;
a source of fuel carried by said rocket;
a quantity of oxidizer stored in said oxidizer tanks;
a rocket motor carriage associated with said rocket for providing thrust, said motor carriage comprising:
at least one rocket motor adapted to be actuated to initiate flight of said rocket; and,
means for operatively coupling said carriage to said rocket for facilitating vertical axial displacement of said carriage upwardly through said rocket interior, sequentially between aligned stages;
means for delivering fuel and oxidizer to said rocket carriage for powering said motor; and,
whereby said rocket carriage moves upwardly within said rocket during flight and, as said oxidizer tanks are depleted, they may be serially ejected in the form of stages.

10. The rocket as defined in claim 9 including a plurality of radially spaced apart rail means defined within said rocket interior for securing and guiding said rocket motor carriage.

11. The rocket as defined in claim 10 wherein each of said rail means comprises axially aligned multiple segments, one segment associated with the interior of each of said annular tanks.

12. The rocket as defined in claim 11 wherein said carriage comprises a rigid circumferential supportive ring, and gasket means associated with the outer periphery of said ring for forming a seal between said ring and the interior of said rocket.

13. The rocket as defined in claim 12 including a plurality of radially spaced apart rail means defined within said rocket interior for guiding said rocket motor carriage and permitting axial movement while resisting torsional displacements.

14. The rocket as defined in claim 13 wherein said ring includes skate means adapted to be slidably coupled to said rail means to facilitate axial displacement of said carriage within said rocket interior, said skate means including suitable channels for receiving said rail means.

15. The rocket as defined in claim 14 wherein each of said rail means comprises axially aligned multiple segments, one segment associated with the interior of each of said annular tanks.

* * * * *